US008814106B2

(12) United States Patent
Aguilera

(10) Patent No.: US 8,814,106 B2
(45) Date of Patent: Aug. 26, 2014

(54) TRAVEL HEAD SUPPORT

(76) Inventor: Leo Aguilera, Sherwood, OR (US)

( * ) Notice: Subject to any disclaimer, the term of this patent is extended or adjusted under 35 U.S.C. 154(b) by 242 days.

(21) Appl. No.: 12/948,694

(22) Filed: Nov. 17, 2010

(65) Prior Publication Data
US 2011/0113557 A1    May 19, 2011

Related U.S. Application Data

(60) Provisional application No. 61/262,121, filed on Nov. 17, 2009.

(51) Int. Cl.
*A47C 16/00* (2006.01)
*A47C 7/38* (2006.01)
*B60N 2/48* (2006.01)

(52) U.S. Cl.
CPC ............... *A47C 16/00* (2013.01); *A47C 7/383* (2013.01); *B60N 2/4879* (2013.01)
USPC ............... 248/118; 297/392; 297/393; 5/640; 5/643

(58) Field of Classification Search
CPC ...... A47C 7/383; A47C 16/00; A47G 9/1009; A61G 7/072; A61G 7/1084; A61G 13/121; A61G 15/125; A61G 2005/121
USPC ................... 5/636, 637, 640, 643, 657, 622; 128/845; 248/118; 297/391–393
See application file for complete search history.

(56) References Cited

U.S. PATENT DOCUMENTS

| | | | | |
|---|---|---|---|---|
| 3,380,694 | A * | 4/1968 | Branner | 248/118 |
| 5,501,646 | A * | 3/1996 | Miller | 482/11 |
| 5,735,496 | A * | 4/1998 | Dube | 248/118 |
| 6,957,867 | B1 * | 10/2005 | Su | 297/411.36 |
| 7,789,843 | B2 * | 9/2010 | Ray | 602/18 |
| 2005/0001111 | A1 * | 1/2005 | Wang | 248/118 |

* cited by examiner

*Primary Examiner* — Nicolas Polito
(74) *Attorney, Agent, or Firm* — Baumgartner Patent Law; Marc Baumgartner

(57) ABSTRACT

An embodiment is a travel head support to support a traveler's head as, for example, they sleep while sitting substantially upright. By supporting the traveler's head, the travel head support of an embodiment may increase the comfort, quality, and restfulness of the traveler's sleep. In particular, by supporting the traveler's head, the travel head support of an embodiment may substantially prevent the embarrassment and/or sleep interruption of one or more hypnic jerks.

4 Claims, 8 Drawing Sheets

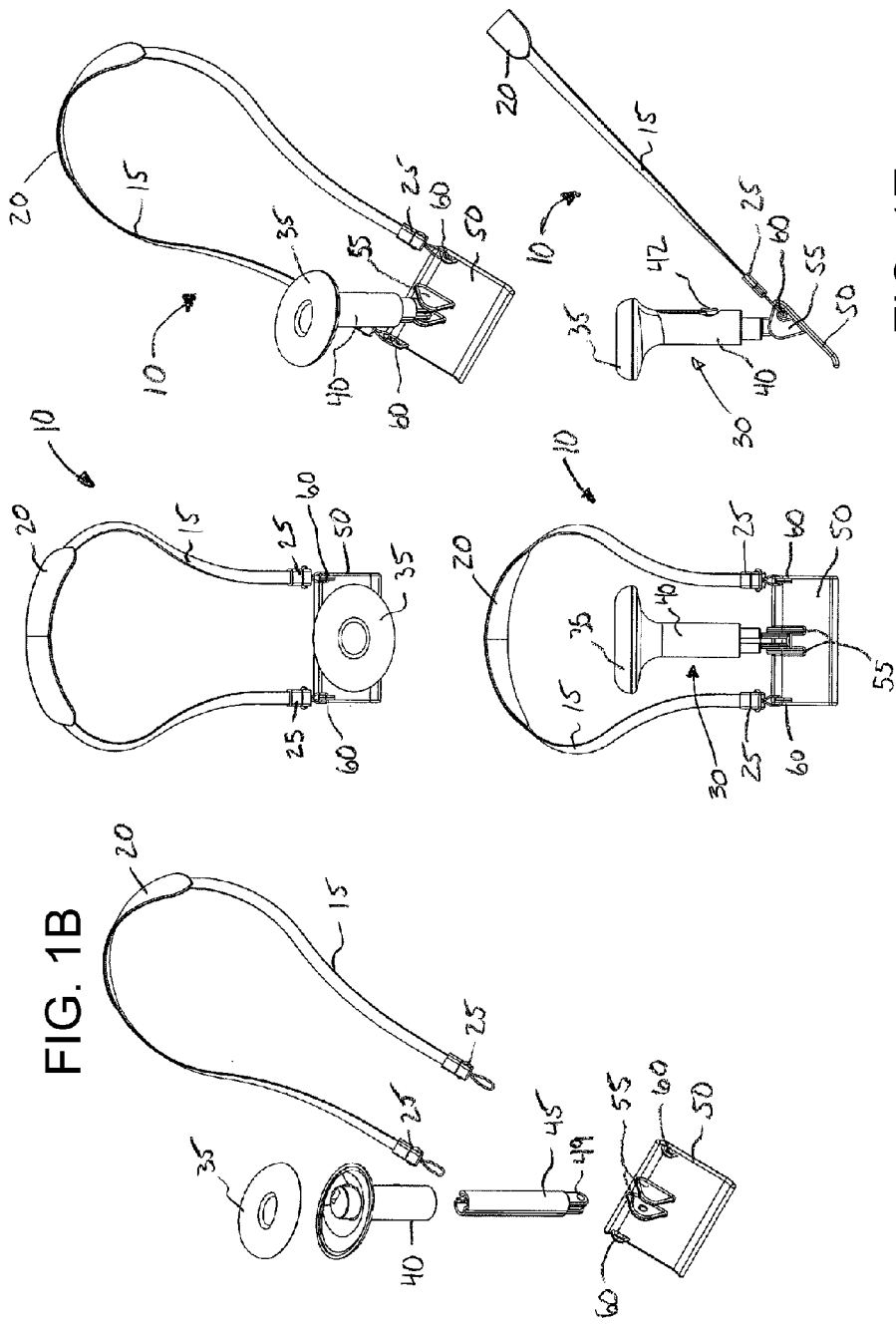

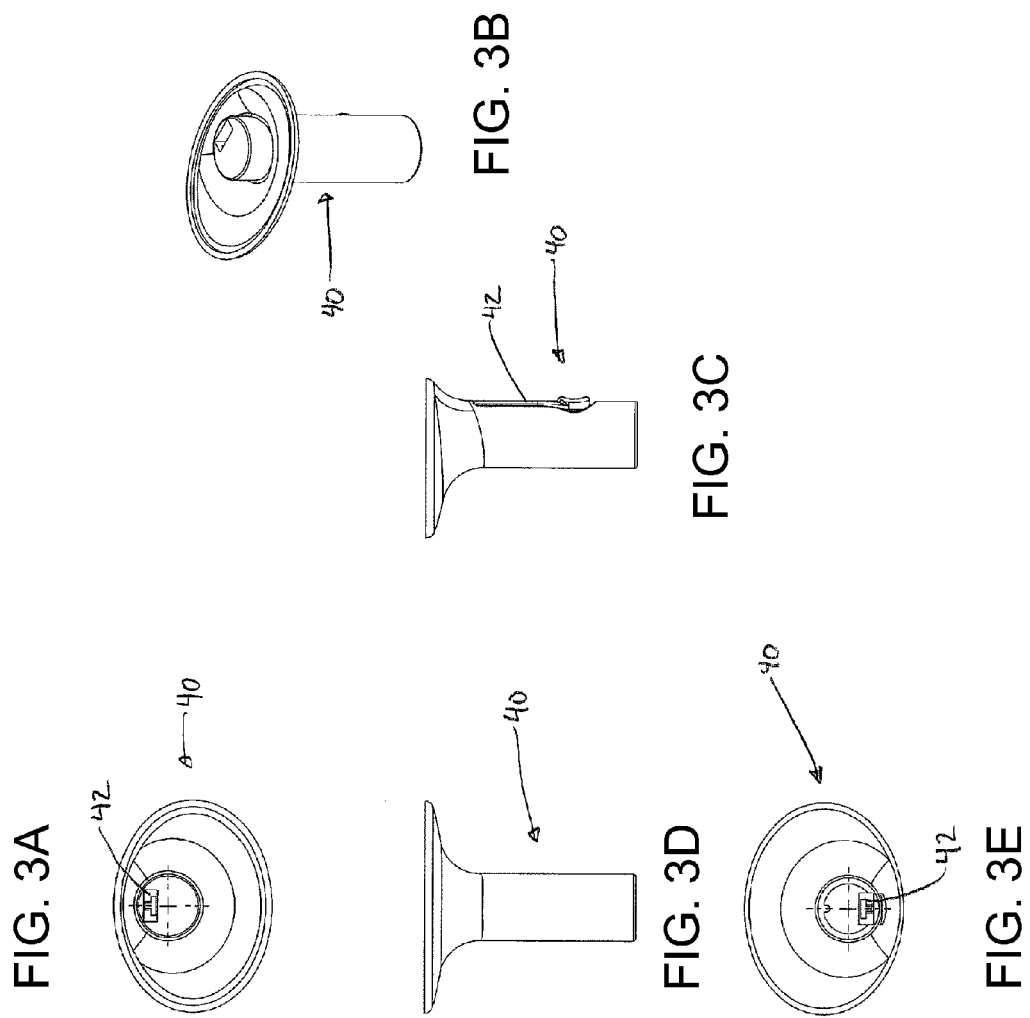

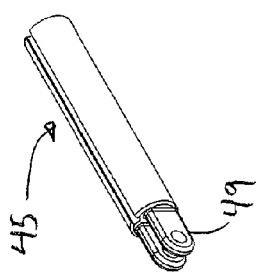
FIG. 4C
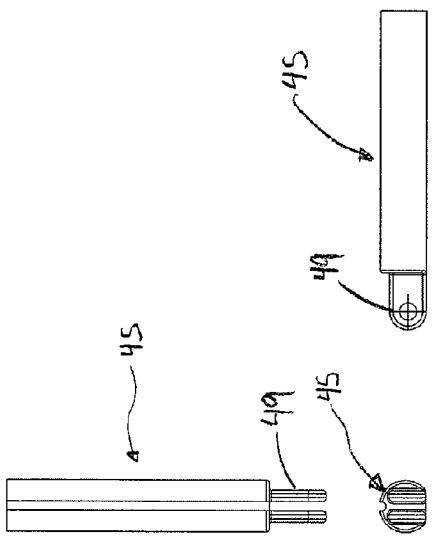
FIG. 4A
FIG. 4B
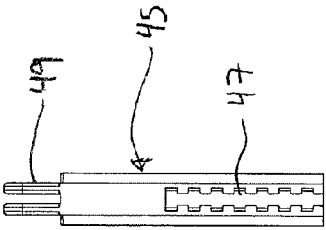
FIG. 4D

US 8,814,106 B2

TRAVEL HEAD SUPPORT

CROSS-REFERENCE TO RELATED APPLICATION

This application is a nonprovisional application claiming priority to provisional patent application Ser. No. 61/262,121, filed Nov. 17, 2009, which is incorporated herein by reference.

FIELD OF THE INVENTION

The present invention relates to a head supporting device. More particularly, the present invention relates to head supporting device to support a person's head as they sleep upright.

BACKGROUND

Regardless of destination and arrangements, travel may a time and energy consuming proposition for any traveler. Airplane, train, and bus travelers in particular must often endure extended periods of travel in less than spacious accommodations. In particular, short of the lucky few whose travel accommodations enable them to lie down, most travelers must tolerate those extended periods sitting upright. To pass the time or otherwise break the monotony, a traveler may attempt to sleep. However, sleeping while sitting upright may be difficult or impossible for some travelers, and at least awkward for those who can find sleep.

For example, when a person sitting upright begins to falls asleep, their body may relax and among other movements, their head may drop and/or otherwise fall forward. At this point, the person may jerk suddenly awake, potentially both causing embarrassment to themselves and startling those seated close by. Scientifically speaking, the potentially embarrassing muscle twitch is known as a hypnagogic myoclonic twitch or "hypnic jerk." in general, the hypnic jerk can be explained as the brain's response to the traveler's muscles as they begin to slack and go into a restful state just as the traveler is falling asleep. The traveler's brain may sense these relaxation signals and misinterpret them by thinking that the traveler is falling down. In response, the brain may send signals to the muscles in the traveler's arms and legs in an attempt to jerk them back upright. Some studies suggest that up to 70 percent of all people experience this phenomenon just after nodding off.

Thus, there is a need for a device and/or method to mitigate the embarrassing hypnic jerk and/or to make sleeping upright more achievable and comfortable. Presently known art that attempt to address this problem include:

| Reference: | issued to: | Date of Issue/Publication: |
|---|---|---|
| US 2002/0050009 | Ley | May 2, 2002 |
| U.S. Pat. No. 7,500,279 | Jackson | Mar. 10, 2009 |
| U.S. Pat. No. 7,055,908 | Williams | Jun. 6, 2008 |
| U.S. Pat. No. 7,036,188 | Knickerbocker | May 2, 2006 |
| U.S. Pat. No. 6,718,581 | Riach | Apr. 13, 2004 |
| U.S. Pat. No. 8,427,273 | Berke et al. | Aug. 8, 2002 |
| U.S. Pat. No. 6,231,535 | Mainiero et al. | May 15, 2001 |
| U.S. Pat. No. 5,303,890 | Carruth | Apr. 19, 1994 |
| U.S. Pat. No. 4,585,408 | Palley | Jan. 21, 1986 |
| U.S. Pat. No. 4,504,050 | Osborne | Mar. 12, 1985 |
| U.S. Pat. No. 3,380,894 | Branner | Apr. 30, 1988 |
| US D582,045 | James | Dec. 2, 2008 |
| US D396,594 | Lefebvre | Aug. 4, 1998 |

The teachings of each of the above-listed citations (which do not themselves incorporate essential material by reference) are herein incorporated by reference. None of the above inventions and patents, taken either singularly or in combination, is seen to describe the instant invention as claimed.

SUMMARY AND ADVANTAGES

The travel head support of an embodiment of the invention presents numerous advantages, including: (1) substantially prevents hypnic jerk for travelers sleeping while seated upright; (2) increases the comfort and restfulness of a traveler's sleep while sleeping upright; (3) adjustable for various chin heights; (4) compact size compared to bulky travel pillows or the like; (5) in a relaxed position, enables wearer to read talk or eat without removing the travel head support; (6) lightweight and will fit into a purse, briefcase, computer bag, or any other carry-on sized travel bag; (7) attractive and stylish; (8) will not interfere with women's make-up or hairstyle; and (9) not intrusive to wearer or other travelers.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIGS. 1A-1E show various views of the travel head support of an embodiment.

FIGS. 3A-3E show various views of the chin support pad base of an embodiment.

FIGS. 4A-4D show the various views of the chin support extension of an embodiment.

REFERENCE NUMBERS USED IN DRAWINGS

Figure 2B:
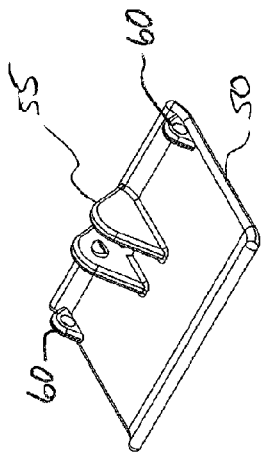
FIGS. 2A-2D show various views of the chin support extension base of an embodiment.
Figure 2D:
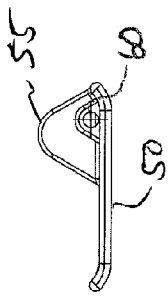
Figure 2A:
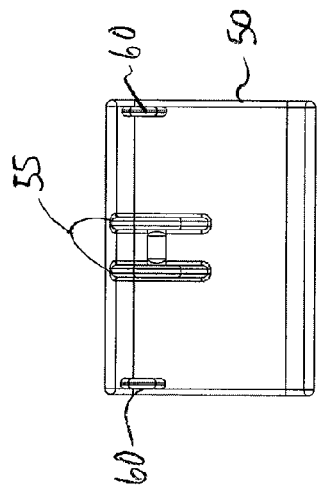
Figure 2C:
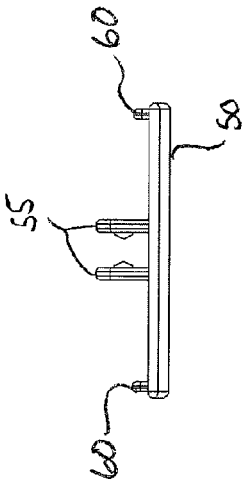

Turning now descriptively to the drawings, in which similar reference characters denote similar elements throughout the several views, the figures illustrate the travel head support of an embodiment of the present invention. With regard to the reference numerals used, the following numbering is used throughout the various drawing figures:

| | |
|---|---|
| 10 | travel head support |
| 15 | neck strap |
| 20 | neck strap pad |
| 25 | neck strap end |
| 30 | chin support assembly |
| 35 | chin support pad |
| 40 | chin support pad base |
| 42 | chin support pad base locking mechanism |
| 45 | chin support extension |
| 47 | chin support extension locking teeth |
| 49 | chin support extension pivot |
| 50 | chin support extension base |
| 55 | chin support extension base pivot |
| 60 | chin support neck strap attachment point |
| C | chin |
| N | neck |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As shown in FIGS. 1-8, a travel head support 10 is provided. Simply stated, the travel head support 10 of an embodiment may support a traveler's head as, for example, they sleep while sitting substantially upright. By supporting the traveler's head, the travel head support 10 of an embodiment may increase the comfort, quality, and restfulness of the traveler's sleep. In particular, by supporting the traveler's head, the travel head support 10 of an embodiment may substantially prevent the embarrassment and/or sleep interruption of one or more hypnic jerks.

Figure 5:
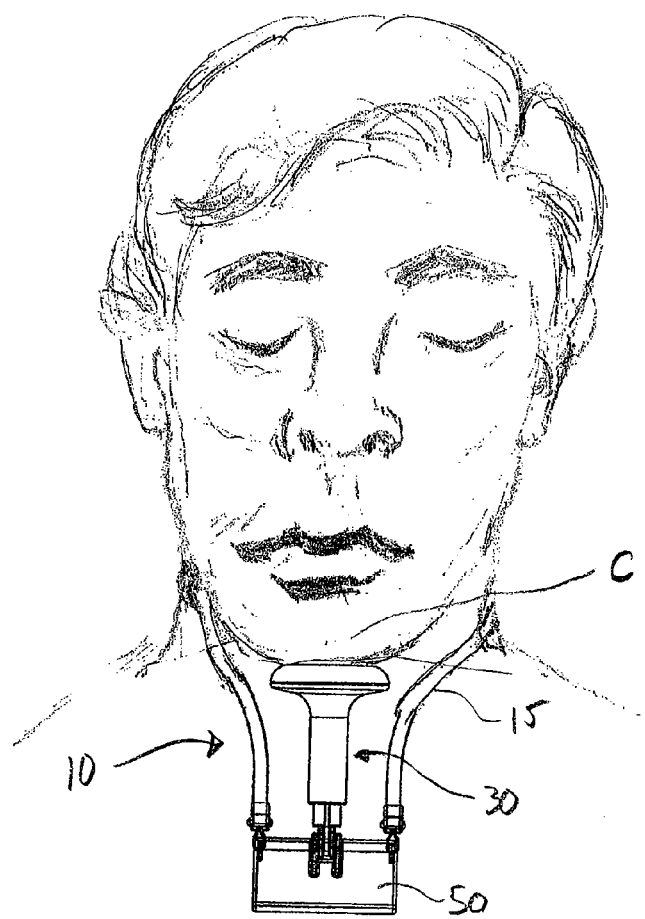
FIG. 5 shows a front view of the travel head support of an embodiment in use to support a traveler's head.
Figure 6:
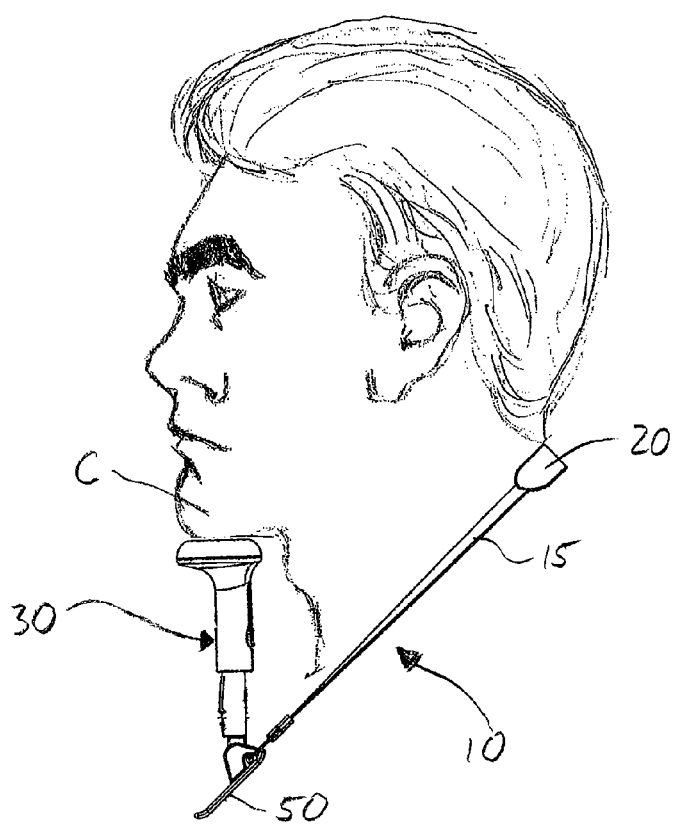
FIG. 6 shows a side view of the travel head support of an embodiment to support a traveler's head.
Figure 7:
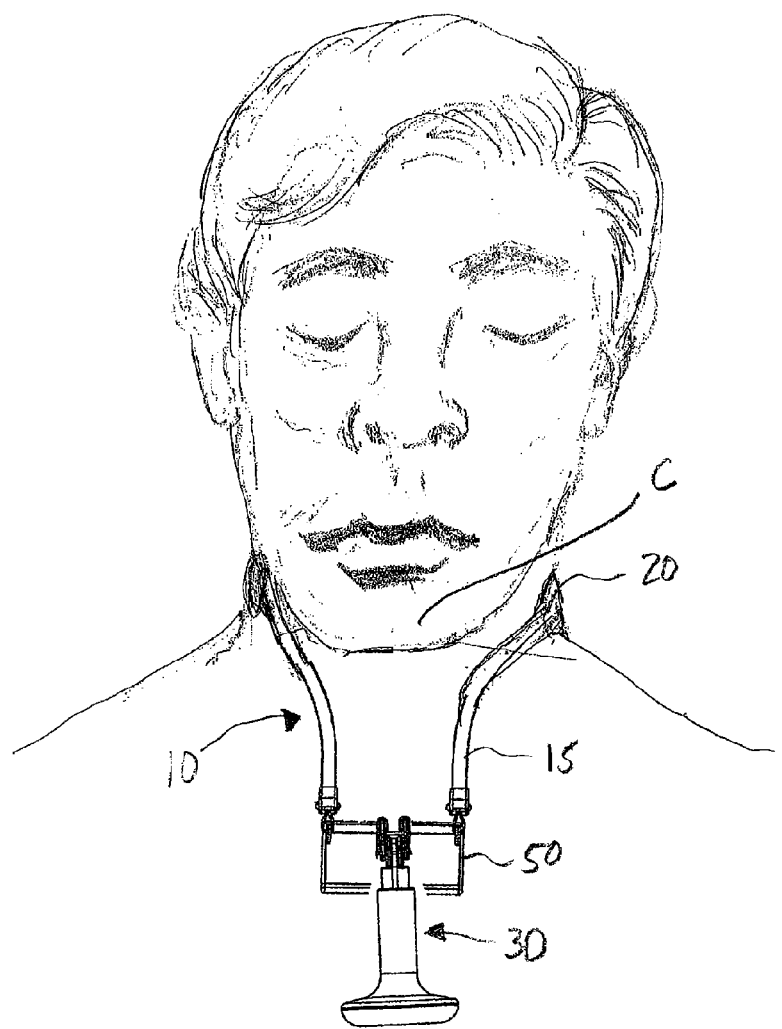
FIG. 7 shows a front view of travel head support of an embodiment in a relaxed position.
Figure 8:
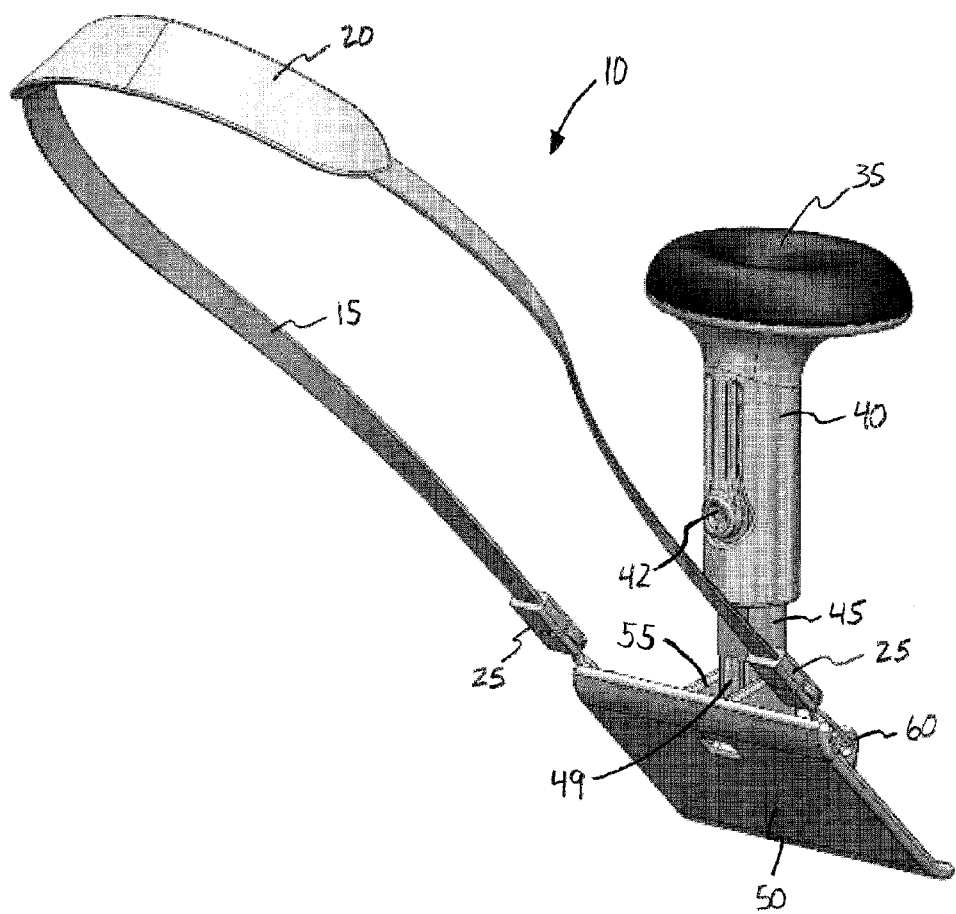
FIG. 8 shows a perspective view of the travel head support of an embodiment.

FIGS. 1 and 8 illustrate various views of the travel head rest 10 of an embodiment. Generally speaking, the travel head rest 10 includes a neck strap 15 including a neck strap pad 20 to extend around the traveler's neck (e.g., as illustrated by FIGS. 5-7) to substantially hold a chin support 30 in place. As they sleep, the traveler may rest their chin on chin support 30 to substantially prevent their head from bobbing or falling forward and triggering a hypnic jerk. Further, the stability of the travel head rest 10 may further increase the comfort, quality, and restfulness of the traveler's sleep.

More specifically, the neck strap 15 including neck strap pad 20 may include a pair of neck strap ends 25 to couple to a chin support extension base 50, for example at chin support neck strap attachment points 60 (as illustrated in detail by FIG. 2). In an embodiment, the neck strap ends 25 may include loops, clips, latches, or the like to detachably engage the chin support neck strap attachment points 60. In an embodiment, the chin support neck strap attachment points 60 may include loops, cleats, holes or any other features to detachably engage the neck strap ends 25. Further, the detachable engagement between the neck strap 15 and the chin support extension base 50 may be substantially flexible, pivotable, or the like so that the chin support extension base 50 may sit and/or rest substantially flatly against the traveler's torso (e.g., approximately adjacent the traveler's sternum) and with sufficient stability to support the chin support 30 as will be explained more fully below. In an embodiment (not illustrated) the length of the neck strap 15 and/or position of the neck strap pad 15 may be adjustable to suit various traveler neck sizes and configurations.

The chin support extension base 50 may include a chin support extension base pivot 55 to detachably engage the chin support 30. More specifically, the chin support 30 may include a chin support extension 45 and a chin support extension pivot 49 coupled to a chin support extension 45. The chin support extension pivot 49 may pivotably engage the chin support extension base pivot 55. At the opposite end from the chin support extension pivot 49, the chin support extension 45 may adjustably engage a chin support pad base 40.

In an embodiment, and as illustrated by FIGS. 3A-3E and 4A-4D, the chin support pad base 40 may adjustably engage the chin support extension 45 to adjust the length of the chin support 30. In particular, the chin support extension 45 may be shaped approximately like a cylinder over which the chin support pad base 40 approximately shaped as a hollow cylinder may slide and/or telescope. In an embodiment, the chin support extension 45 may include a plurality of chin support extension locking teeth 47 to engage a chin support pad base locking mechanism 42 of the chin support pad base 40. For example, the chin support pad base locking mechanism 42 may be a push-button or the like that may release the chin support extension locking teeth 47 when depressed (i.e., it is lock biased) so that the chin support pad base may slide along the chin support extension 45. At a desirable chin support 30 length (e.g., for which the traveler may have their chin C comfortably supported) the chin support pad base locking mechanism 42 may be released to engage one or more chin support extension locking teeth 47 to substantially lock the length of the chin support 30.

The chin support pad base 40 may further include chin support pad 35 on which a traveler may rest their chin. In an embodiment, the chin support pad 35 may shaped like an annulus, toroid, torus, or more generally like a donut or like half of a donut. Alternately, the chin support pad 35 may be substantially circular with an indentation approximately centered on the chin support pad 35 to accommodate the traveler's chin. More specifically, the center of the annulus, toroid, torus, donut, or other indentation, may substantially prevent the chin from slipping off the chin support pad 35.

In an embodiment the chin support pad 35 may be formed from a foam, a closed-cell foam, a gel, a memory foam, or a combination thereof. Further, chin support pad 35 may include a cover, a covering, a surface material or the like (not illustrated) that may increase the comfort of the support pad 35 for the traveler's chin. In an embodiment, the chin support pad 35 and/or its cover or covering may be removed from the chin support pad base 40, for example to clean or replace the chin support pad 35 and/or its cover or covering.

The structure of travel head support 10 (for example, other than the chin support pad 35, the neck strap 15, and the neck strap pad 20) may be formed from a lightweight, substantially rigid material. For example, various portions of the travel head support 10 may be formed from plastic or plastic-like material. The plastic or plastic-like material may include coloring, texture, designs, or the like to increase the fashion and style of the travel head support 10. Alternately, the coloring, texture, designs, or the like may increase the ability with which the traveler may covertly deploy and use the travel head support 10.

The lightweight construction of the travel head support member 10, as well as the ability of the chin support 30 to pivot relative to the chin support extension base 50 may enable the head support member 10 of an embodiment to be easily stored, transported, and deployed. For example, the head support member 10 may be stored and/or transported in a purse, a briefcase, a computer bag, and/or any other travel bag that may be, for example, carried on to and easily accessible during a flight.

In operation in one embodiment as illustrated by FIGS. 5-7, the traveler may slip the neck strap 15 of the travel head support 10 over their neck N and rest their chin C on the chin support pad 35 to increase the comfort and restfulness of sleeping while sitting upright. As illustrated by FIG. 6, once the traveler has the travel head support 10 around their neck N, they may adjust the height of the chin support pad 35 by operating the chin support pad base locking mechanism 42 (e.g., a push-button) until the chin support 30 has a desirable length to support their head in a comfortable position.

As the travel head support 10 of an embodiment rests against and or supports only the traveler's chin C, neck N, and the upper chest (not illustrated), the travel head support 10 may not substantially interfere with a traveler's makeup, hair or hairstyle, and/or clothing. Accordingly, not only may a traveler arrive at their destination well-rested, but they may also not appear disheveled as they might with a travel pillow, head rest, or other less convenient and/or more intrusive alternative.

FIG. 7 illustrates that the chin support 30 of an embodiment may pivot away from the traveler's chin C when not in use so that the traveler does not have to completely remove the travel head support 10 of an embodiment when they may not wish its support. For example, a traveler may eat or drink, hold a conversation or otherwise speak, and/or maintain the mobility of their head for any other reason without having to remove the travel head support 10 of an embodiment from around their neck N.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A head support, comprising:
   a chin support extension base coupled to a neck strap such that when worn, the chin support extension base is positioned approximately adjacent to a user's sternum and with sufficient stability to support an adjustable chin support assembly;
   the adjustable chin support assembly comprising a chin support pad base to support a user's chin and a chin support extension pivotably coupled to the chin support extension base such that the chin support extension solely pivots in one plane, away and towards the user's chin;
   wherein the chin support extension has locking teeth; and
   wherein the chin support pad base comprises a depressable chin support pad base locking mechanism configured to engage with the locking teeth when not depressed and configured to release the locking teeth when depressed, thereby allowing the chin support pad base to slide along the chin support extension.

2. The head support of claim 1, the adjustable chin support assembly including a chin support pad to further support the user's chin to substantially prevent one or more hypnic jerks while the user sleeps in a seated position.

3. The head support of claim 1, wherein the chin support pad is approximately shaped like an annulus, a toroid, a torus, a donut, or a circle including an indentation approximately at its center to support the user's chin.

4. The head support of claim 3, the chin support pad further comprising foam, closed-cell foam, gel, memory foam, or a combination thereof to substantially comfortably support the user's chin.

* * * * *